Oct. 2, 1956   E. J. WEBBER   2,764,836
ARTIFICIAL LURES
Filed Feb. 19, 1953

INVENTOR.
ERNEST J. WEBBER
BY John L. Woodward
His Attorney

United States Patent Office 2,764,836
Patented Oct. 2, 1956

2,764,836

ARTIFICIAL LURES

Ernest J. Webber, Long Lake, Minn.

Application February 19, 1953, Serial No. 337,721

2 Claims. (Cl. 43—42.31)

This invention relates to an artificial bait or plug for catching fish such as bass, walleyes etc.

It is an object of this invention to provide in an artificial lure a buoyant bait which is so constructed that it will simulate a fish's swimming movements and is also provided with means so that when the bait is given a sudden jerk the bait will simulate the action of a small injured fish trying to keep itself under the surface of the water.

It is another object of this invention to provide in an artificial lure a circumferential offset portion on the surface of the bait which will cause an unusual or turbulent sound when jerked through the water for attracting fish to the lure.

These and other objects of the invention will become apparent and better understood after consideration has been given to the following detailed description of the invention taken in connection with the drawing which shows, merely by way of illustration, structure adapted for carrying out the objects of the invention.

Figure 1:
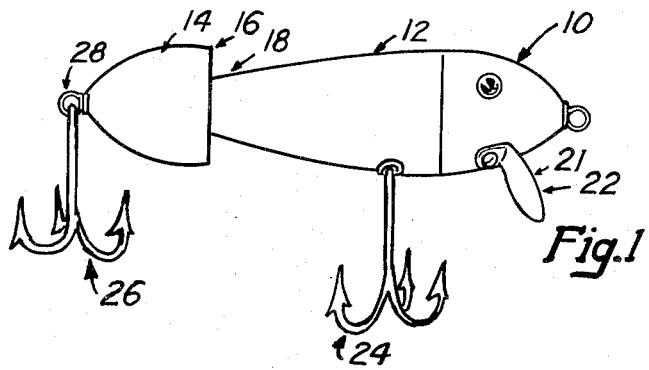
Figure 1 is a view in side elevation of the artificial bait.
Figure 2:
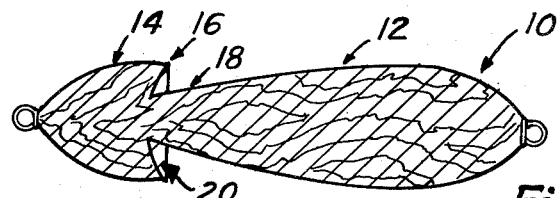
Figure 2 is a horizontal sectional view of the bait as shown in Figure 1 of the drawing.
Figure 4:
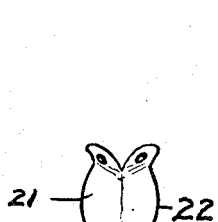
Figure 4 is a front view of the chin piece
Figure 3:
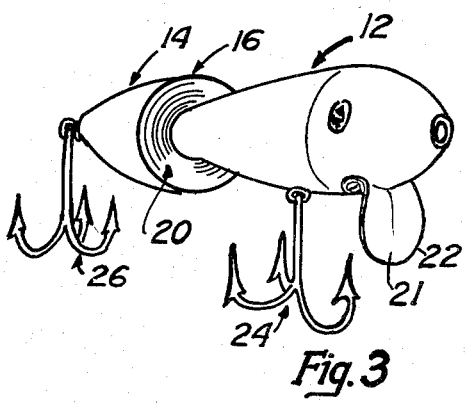
Figure 3 is a perspective view of the artificial bait showing the circumferential offset surface embodying the essential novelty of the bait.

Referring in detail to the figures of the drawings 10 is an artificial lure-plug of elongated construction made of material which is buoyant in water such as wood or the like. The lure 10 comprises a front body portion 12 of stream-lined configuration similar to the body of a fish, with the front end larger than the rest of the body so that the greatest buoyancy is at or close to the front of the lure 10. The rear or tail portion 14 of the lure 10 is of cone-shaped construction. The front end 16 of the rear portion 14 is offset or extends beyond the rear or adjacent portion 18 of the front portion 12 of the lure 10. The front end 16 of the tail 14 of the lure 10 is provided with a circumferentially inwardly curving recess as at 20 formed about the rear portion 18 of the body 12 thus providing a relatively large surface area for engaging the water when the lure 10 is jerked through the water as hereinafter set forth.

The artificial lure or plug 10 is provided with a downwardly depending flange of metal 22, or the like provided with a bowed or concaved surface 21 on its front side, for a purpose set forth hereinafter. A pair of gang hooks 24 and 26 are suspended from the underside and rear end of the lure 10 by any suitable means such as threaded eyes 28.

The plug 10 is so formed that, when cast and retrieved in short jerks, the offset circumferential inwardly curving surface 20 provided at the front of the tail portion 14 of the artificial lure 10 engages the water resulting in a loud splash or churning of the water and air is drawn under the surface of the water causing a large number of air bubbles to drift to the surface of the water behind the lure 10. When the lure 10 is jerked resulting in a loud splash and also causing air bubbles to drift to the surface of the water, it simulates somewhat the action of an injured small fish on the surface of the water trying to submerge itself below the surface of the water. This simulated sound of a wounded fish attempting to dive beneath the surface of the water attracts larger fish to the bait 10. If the lure 10 is retrieved in a steady reeling-in motion, the concaved flange 22 causes it to wiggle similar to a swimming minnow.

My lure 10 is a combination surface "popper" and/or underwater wiggler. Such a lure can be used as a "popper" and an under water wiggler on the same cast.

The foregoing description and the accompanying drawing to which it relates, describes what might be termed the preferred modes of practicing the invention. It is to be clearly understood, however, that the invention includes each and every novel feature or combination of novel features herein disclosed, subject only to the restrictions of the prior art, and that the invention may assume other forms and it is not to be limited to the particular and specific structure described herein.

Having thus described my invention what I claim is:

1. A fish lure comprising a buoyant body having an enlarged forward section and a smaller rear section, the ratio of the lengths of said sections being substantially three to one, the greatest cross-sectional dimension of each section being substantially the same, the rear section in the zone where it joins the front section having its face concave, and the front section having the rear portion thereof tapering to a cross-sectional dimension approximately equal to one half the greatest cross-sectional dimension of the rear section.

2. The combination in accordance with claim 1 further comprising a downwardly projecting metal flange having a concave surface on its front side, said flange being secured to the front lower side of said enlarged forward section.

References Cited in the file of this patent

UNITED STATES PATENTS

| D. 115,571 | Strite | July 4, 1939 |
| 696,433 | Heddon | Apr. 1, 1902 |
| 1,495,832 | Aiken | May 27, 1924 |
| 2,333,174 | Heddon | Nov. 2, 1943 |
| 2,387,255 | Godlewski | Oct. 23, 1945 |
| 2,526,115 | Boyette | Oct. 17, 1950 |